United States Patent
Banerjea et al.

(10) Patent No.: US 7,224,697 B2
(45) Date of Patent: May 29, 2007

(54) DYNAMIC CHANNEL SELECTOR AND METHOD OF SELECTING A CHANNEL IN A WIRELESS LOCAL AREA NETWORK

(75) Inventors: Raja Banerjea, Edison, NJ (US); Yuan Jiang, Toronto (CA)

(73) Assignee: Agere Systems Inc., Allentown, PA (US)

( * ) Notice: Subject to any disclaimer, the term of this patent is extended or adjusted under 35 U.S.C. 154(b) by 1042 days.

(21) Appl. No.: 10/287,390

(22) Filed: Nov. 4, 2002

(65) Prior Publication Data
US 2004/0085896 A1    May 6, 2004

(51) Int. Cl.
*H04L 12/28* (2006.01)
(52) U.S. Cl. .................. 370/401; 370/329; 370/431; 370/332; 455/452.1
(58) Field of Classification Search .............. None
See application file for complete search history.

(56) References Cited

U.S. PATENT DOCUMENTS

| | | | |
|---|---|---|---|
| 5,933,420 A * | 8/1999 | Jaszewski et al. | 370/329 |
| 6,694,141 B1 * | 2/2004 | Pulkkinen et al. | 455/454 |
| 7,110,374 B2 * | 9/2006 | Malhotra et al. | 370/329 |

\* cited by examiner

*Primary Examiner*—Duc Ho

(57) ABSTRACT

The present invention is directed to a dynamic channel selector for use with a wireless local area network and a method of selecting a channel therein. In one embodiment, the dynamic channel selector includes a channel quality subsystem that monitors a signal quality of a signal traversing a first channel of the wireless local area network and a noise level of the first channel. The dynamic channel selector also includes an interference mitigation subsystem, coupled to the channel quality subsystem, that selects a second channel of the wireless local area network as a function of the signal quality of the signal traversing the first channel and the noise level of the first channel.

18 Claims, 3 Drawing Sheets

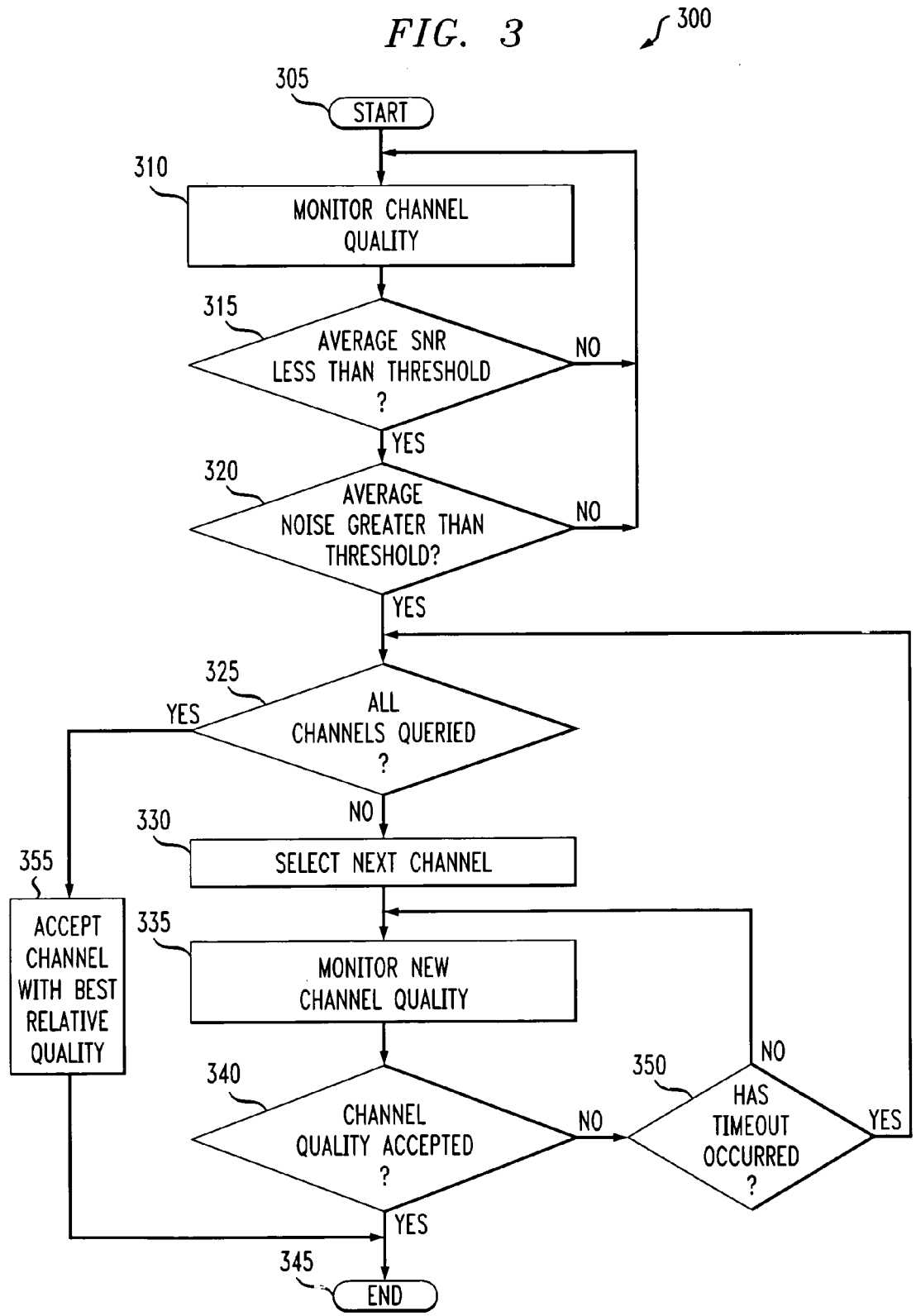

DYNAMIC CHANNEL SELECTOR AND METHOD OF SELECTING A CHANNEL IN A WIRELESS LOCAL AREA NETWORK

TECHNICAL FIELD OF THE INVENTION

The present invention is directed, in general, to communication systems and, more specifically, to a dynamic channel selector, method of selecting a channel in a wireless local area network, and an access point employing the same.

BACKGROUND OF THE INVENTION

The use of local area networks has revolutionized the business environment allowing a client device, such as a personal computer employed by a user, to effectively communicate both with servers and other clients associated with the local area network. Pockets of information that were once basically isolated from one another may easily be shared and augmented throughout the network. Until recently, local area networks, consisting of connections that are hard-wired, have served user needs well. However, technological advances have allowed network users to become much more mobile thereby creating user connectivity and other network operational problems.

An extension of network connectivity allows users employing wireless devices access to the wired local area network by employing a wireless local area network. This may be accomplished, in one example, by using a wireless local area network that is based on the IEEE 802.11 standard, which is incorporated herein by reference. A basic technology of an IEEE 802.11 network employs an access point whose main function is to form a bridge between the wired and wireless local area networks. The access point is analogous to a base station used in cellular phone networks. When employed, all communications between a wireless client and a wired client go through the access point.

The IEEE 802.11 standard accommodates several wireless channel structures. In each case, the access point assigns a wireless channel to each wireless client for use while communicating with the wired local area network or with another wireless client associated with the access point. Unfortunately, the wireless channels afforded by the IEEE 802.11 standard are not unique or exclusive of wireless channels assigned to other wireless devices, such as 2.4 gigahertz portable telephones. Interference afforded by such devices has been identified as a major problem in the use and application of wireless local area networks based on the IEEE 802.11 and other standards. Such interference, unless mitigated in some manner, may reduce the reliability and effectiveness of a wireless local area network to the point of being unusable.

Accordingly, what is needed in the art is a way to effectively mitigate interference on a wireless channel of a wireless local area network that preferably does not require changes to the wireless client.

SUMMARY OF THE INVENTION

To address the above-discussed deficiencies of the prior art, the present invention provides a dynamic channel selector for use with a wireless local area network. In one embodiment, the dynamic channel selector includes a channel quality subsystem that monitors a signal quality of a signal traversing a first channel of the wireless local area network and a noise level of the first channel. The dynamic channel selector also includes an interference mitigation subsystem, coupled to the channel quality subsystem, that selects a second channel of the wireless local area network as a function of the signal quality of the signal traversing the first channel and the noise level of the first channel.

In another aspect, the present invention provides a method of selecting a channel in a wireless local area network. In one embodiment, the method includes monitoring a signal quality of a signal traversing a first channel of the wireless local area network and a noise level of the first channel. The method also includes selecting a second channel of the wireless local area network as a function of the signal quality of the signal traversing the first channel and the noise level of the first channel.

In yet another aspect, the present invention provides an access point for use with a wired network and a wireless local area network. In one embodiment, the access point includes a network interface coupled to the wired network and a transceiver coupled via an antenna to the wireless local area network. The access point also includes a controller, coupled to the network interface and the transceiver, including a multiplexer layer subsystem that multiplexes information traversing the access point, and a bridging subsystem that bridges information employing disparate forms of communication protocols. The controller also includes a dynamic channel selector, coupled to the multiplexer layer subsystem and the bridging subsystem, including a channel quality subsystem that monitors a signal quality of a signal traversing a first channel of the wireless local area network and a noise level of the first channel. The dynamic channel selector also includes an interference mitigation subsystem, coupled to the channel quality subsystem, that selects a second channel of the wireless local area network as a function of the signal quality of the signal traversing the first channel and the noise level of the first channel.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 3 illustrates a flow diagram of an embodiment of a method of selecting a channel in a communication network, constructed in accordance with the principles of the present invention.

DETAILED DESCRIPTION

Figure 1:
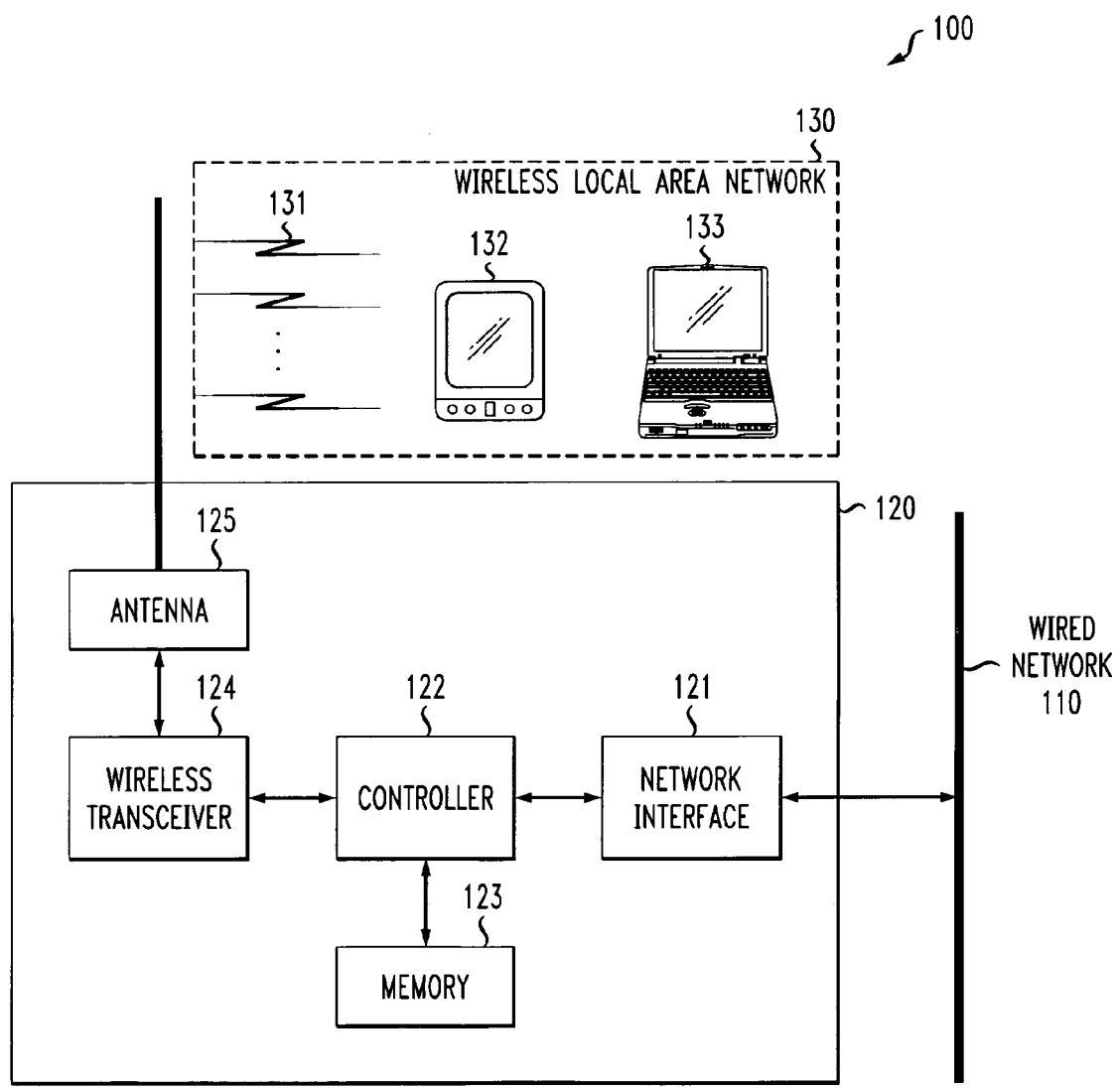
FIG. 1 illustrates a diagram of an embodiment of a communication network, constructed in accordance with the principles of the present invention.

Referring initially to FIG. 1, illustrated is a diagram of an embodiment of a communication network, generally designated 100, constructed in accordance with the principles of the present invention. The communication network 100 includes a wired network 110, an access point 120 and a wireless local area network 130. The wired network 110 generally includes connections to at least one local area network and to the Internet. The access point 120 includes a network interface 121 coupled to the wired network 110, a wireless transceiver 124 coupled via an antenna 125 to the wireless local area network 130 and a controller 122 coupled to the network interface 121, the wireless transceiver 124 and a memory 123. The wireless local area network 130 includes a plurality of wireless channels (one of which is designated 131), a personal digital assistant 132 and a laptop computer 133, which operate as wireless clients in the wireless local area network 130.

In general, the communication network 100 allows the personal digital assistant 132 and the laptop computer 133 to communicate wirelessly with devices, systems and services associated with the wired network 110. Of course, other currently or future available wireless devices may be used as wireless clients. The access point 120 functions to form a bridge between the personal digital assistant 132 or the laptop computer 133 and the wired network 110. Additionally, in the illustrated embodiment, the access point 120 also allows wireless communication between the wireless clients themselves in the wireless local area network 130. Generally, the wireless clients are mobile devices or systems. However, the access point 120 is typically not mobile and constitutes a part of the wired network infrastructure.

The communication network 100 is compliant with the IEEE 802.11 family of standards, in this embodiment of the present invention. Of course, other appropriate currently or future available wireless standards may be employed and are well within the broad scope of the present invention. Each wireless client employs one of the plurality of wireless channels 131 wherein each of the wireless channels 131 has a unique frequency band having only minimal overlap. The wireless channels 131 are accommodated by the wireless transceiver 124 and the antenna 125 under the orchestration of the controller 122. The controller 122 also orchestrates interactions of the wireless clients with the wired network 110 through the network interface 121.

The controller 122 includes a multiplexer layer subsystem that multiplexes information traversing the access point 120 and a bridging subsystem that bridges information employing disparate forms of communication protocols. The controller 122 also includes a dynamic channel selector that is coupled to the multiplexer layer subsystem and the bridging subsystem. The dynamic channel selector includes a channel quality subsystem that monitors a quality of a first wireless channel (first channel) associated with a wireless client of the wireless local area network 130 and an interference mitigation subsystem that is coupled to the channel quality subsystem. The channel quality subsystem monitors qualities such as a signal quality of a signal traversing the first channel and a noise level of the first channel. The interference mitigation subsystem selects a second wireless channel (second channel) of the wireless local area network for the wireless client as a function of the quality of the first channel.

In the illustrated embodiment, channel quality of a channel may be defined as unacceptable when a signal quality of the channel is less than a signal quality threshold, and a noise level of the channel is greater than a noise level threshold. Signal quality may be defined by a signal-to-noise-ratio (SNR) of the channel. The interference mitigation subsystem selects the second channel of the wireless local area network when the channel quality of the first channel becomes unacceptable. This condition may typically occur when the first channel is experiencing interference from sources outside the wireless local area network 130. The interference may be provided from other wireless systems (e.g., a portable telephone, a video transmitter or other narrow band interferers) operating nearby. In contrast, a wireless client that is located too far from its access point will usually experience a decreased signal quality without a corresponding increased noise level. Also, an increased noise level may be tolerated if the signal quality is acceptable. The signal quality employed may be a function of an average or root mean square (RMS) value of the signal, or it may be related to an instantaneous value. The noise level typically may be represented by an average or RMS value.

The quality of each of the channels being employed by the wireless clients is monitored by the channel quality subsystem in the controller 122. This involves monitoring both the signal quality and the noise level of each channel being employed. As discussed above, when the quality of a first channel being employed by a wireless client is unacceptable, the interference mitigation subsystem selects a second available channel for the wireless client. The second channel is then monitored for quality. If its quality is unacceptable, a third available channel is selected and its quality monitored. It should be understood that the quality of the channels may vary from channel to channel.

This process continues until a channel with acceptable quality has been selected. During this time, the memory 123 is employed by the controller 122 to temporarily store information that is traversing the channel. The channel quality subsystem then continues to monitor this last selected channel to assure that its quality remains acceptable. In the event that all of the available channels monitored and selected are unacceptable with respect to quality, the interference mitigation subsystem selects one of the available channels having the best quality for use by the wireless client.

In an alternative mode of operation, each of the wireless clients may be assigned a priority code that distinguishes its level of importance with respect to other wireless clients in the wireless local area network 130. The controller 122 employs its channel quality subsystem to continuously monitor the quality of all channels being used. The quality of a channel may become unacceptable for a wireless client having a higher priority code than another wireless client using a higher quality channel. In this event, the interference mitigation subsystem can assign the higher quality channel to the higher priority code wireless client while the dynamic channel selector searches for a replacement channel for the lower priority wireless client.

Alternatively, the dynamic channel selector may monitor the quality of channels being used and at least the noise level of channels that are not being used. This would allow the dynamic channel selector to provide a channel assignment restructuring plan for all or part of the channel assignments for the currently employed wireless clients depending on their priority codes when the quality of a channel being used becomes unacceptable.

Figure 2:
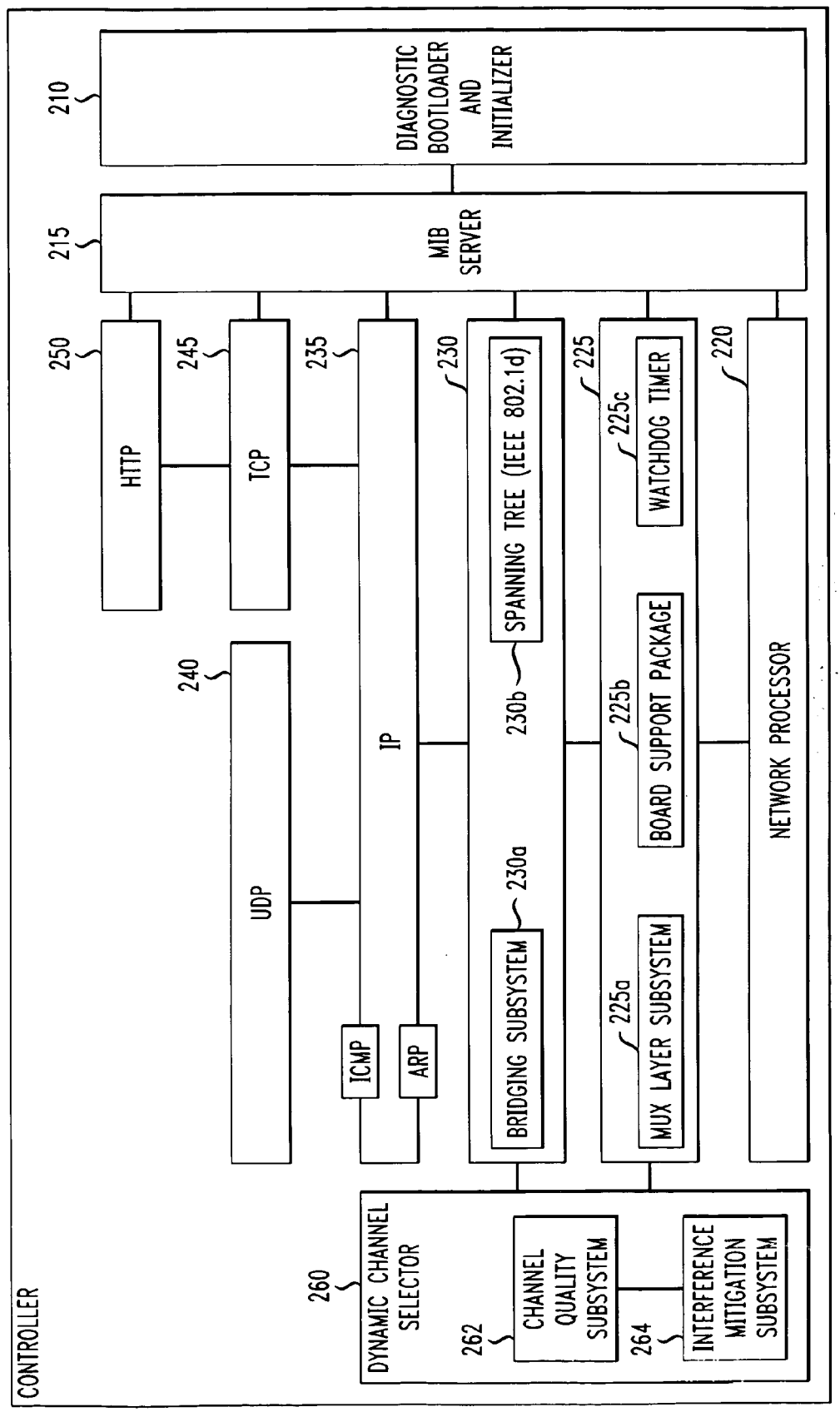
FIG. 2 illustrates a diagram of an embodiment of a controller, constructed in accordance with the principles of the present invention.

Turning now to FIG. 2, illustrated is a diagram of an embodiment of a controller, generally designated 200, constructed in accordance with the principles of the present invention. The controller 200 includes a diagnostic bootloader and initializer 210 and a management information base (MIB) server 215. The controller 200 further includes a network processor 220, a multiplexer (MUX) layer subsystem 225a, a board support package 225b, a watchdog timer 225c, a bridging subsystem 230a, a spanning tree 230b, an Internet protocol (IP) layer 235, a user datagram protocol (UDP) layer 240, a transmission control protocol (TCP) layer 245 and a hypertext transfer protocol (HTTP) layer 250. The controller 200 still further includes a dynamic channel selector 260 having a channel quality subsystem 262 and an interference mitigation subsystem 264.

In the illustrated embodiment, the controller 200 may be represented as a stack that runs on the network processor 220, which may be a digital signal processor (DSP) or another general or special purpose computing device. In an alternative embodiment, the controller 200 may also be embodied solely as a hardware implementation or as a combination of software and hardware. The diagnostic bootloader and initializer 210 facilitates operation between the various layers shown as well as diagnostic and error messages to a wireless client (e.g., the Internet is not available, etc.). The diagnostic bootloader and initializer 210 also initializes the wireless interface employed by the wireless client. The management information base server 215 manages the operation of an access point employing, for instance, the 802.11 family of standards that is associated with the controller 200. It contains information associated with the access point, such as Extended Service Set identification (ESSID) information, so that a network administrator can query the access point. ESSID is a standard feature of the 802.11 standard and every access point has an identification that a wireless client matches for an association therebetween.

The network processor 220 is typically associated with a physical layer and the lowest layer in the stack. All data streams from either Ethernet devices or wireless clients are processed by the multiplexer layer subsystem 225a wherein it provides an application programing interface for these independent streams. The board support package 225b has the drivers to communicate with the Ethernet devices and the wireless devices. The board support package 225b starts and stops the devices, retrieves data therefrom and sends control information to the devices. The watchdog timer 225c is a failsafe device that performs a specific operation after a certain period of time pending an error in the access point and the failure of independent recovery. The bridging subsystem 230a manages the traffic associated with Ethernet and wireless client packets to direct the traffic to the proper port or higher layer. The bridging subsystem 230a is an IEEE 802.11 compliant bridge, in this embodiment. The spanning tree 230b generally prevents loops in the network so that a packet does not loop between the wired and wireless interfaces.

The Internet protocol layer 235 allows a packet to traverse multiple networks on the way to a final destination. The Internet protocol layer 235 employs an Internet control message protocol and an address resolution protocol to facilitate its operation. The Internet control message protocol provides a number of diagnostic functions and can send error packets to hosts. The Internet control message protocol uses the basic support of and is an integral part of the Internet protocol layer 235, and allows an applications program to respond to a ping (i.e., receive a packet and respond). The address resolution protocol maps Internet protocol addresses to Ethernet addresses.

The user datagram protocol layer 240 is a transport layer, connectionless mode protocol providing a datagram mode of communication for delivery of packets to a remote or local user. The user datagram protocol layer 240 defines and describes how messages reach applications within a destination device or computer. The transmission control protocol layer 245 is a transport layer, connection-oriented, end-to-end protocol. The transmission control protocol layer 245 provides reliable, sequenced and unduplicated delivery of bytes to a remote or local user and governs the exchange of sequential data for Internet protocol. The hypertext transfer protocol layer 250 allows users to create their own paths through text, visual and audio information. The Internet protocol layer 235, the transmission control protocol layer 245 and the user datagram protocol layer 240 layer conform to the TCP/IP specification.

In the illustrated embodiment, the dynamic channel selector 260 is coupled to the multiplexer layer subsystem 225a and the bridging subsystem 230a. The dynamic channel selector 260 allows the quality of a wireless channel employed by a wireless client to be monitored and the channel changed if the quality becomes unacceptable, as was discussed with respect to FIG. 1. The channel quality subsystem 262 cooperates within the access point to send a beacon request out to a collection of wireless addresses requiring them to report the quality of their wireless channels. The wireless devices then provide the channel quality (e.g., their signal qualities and noise levels as was discussed with respect to FIG. 1) of their respective wireless channels and respond back. The channel quality subsystem 262 receives this information from the wireless devices.

The interference mitigation subsystem 264 may receive an indication from the channel quality subsystem 262 of an unacceptable first channel quality measurement indicating that its quality has deteriorated. The interference mitigation subsystem 264 then initiates the selection of a second channel for the wireless client. For example, if the first channel is set to channel number five of 14 channels, the interference mitigation subsystem 264 adds four to select the second channel. In the illustrated embodiment, the span of each channel is 22 megahertz, so four times a channel bandwidth of five megahertz is acceptable while maintaining modulo 14 to assure that channel selection does not go beyond channel 14. Of course, other current or future channel monitoring and selection procedures may be employed, using the same or a different number of channels, in alternative embodiments of the present invention to assure the quality of a wireless channel.

Turning now to FIG. 3, illustrated is a flow diagram of an embodiment of a method of selecting a channel in a communication network, generally designated 300, constructed in accordance with the principles of the present invention. The method 300 may be performed within a controller of an access point of a wireless local area network. The method 300 starts in a step 305 with an intent to determine a quality of a first channel being employed in the wireless local area network wherein the quality of the first channel is monitored in a step 310.

In a first decision step 315, it is determined whether a signal quality (as determined by a signal to noise ratio of the first channel, in the illustrated embodiment) is less than a signal quality threshold. This condition may arise because a wireless client employing the first channel is too far from an access point or may be due to interference occurring on the first channel.

If the signal quality is not less than the signal quality threshold in the first decision step 315, the method 300 returns to the step 310 wherein monitoring of the quality of the first channel continues. Alternatively, if the signal quality is less than the signal quality threshold in the first decision step 315, it is determined in a second decision step 320 whether an average noise associated with the first channel is greater than a noise threshold. If the average noise associated with the first channel is not greater than the noise threshold in the second decision step 320, the method 300 also returns to the step 310 wherein monitoring of the quality of the first channel continues.

In this case, the wireless client employing the first channel may be too far from its access point since only signal quality is being affected and changing channels will typically not improve the situation. When the signal quality and the average noise are less than and greater than their respective thresholds, respectively, the quality of the first channel may be unacceptable. This condition indicates that the first channel may be experiencing interference from its surrounding environment and changing to another channel may be advantageous.

For this condition, a third decision step 325 determines whether all of the channels available have been queried. If not, a second channel is selected in a step 330. The method 300 includes storing information traversing the first channel until another channel has been selected, and a quality of the second channel selected in the step 330 is monitored in a step 335. In a fourth decision step 340, acceptability of the quality of the second channel is determined. If the signal quality of the second channel is not less than the signal quality threshold and its noise is not greater than the noise threshold, its quality is accepted and the second channel is employed by the wireless client. The method 300 then ends in a step 345.

If the quality of the second channel is not accepted in the fourth decision step 340 since its signal quality is less than and its noise is greater than their respective thresholds, a fifth decision step 350 determines if a timeout period for monitoring the quality of the second channel has occurred. If the timeout period has not occurred in the fifth decision step 340, the method 300 returns to the step 335 and monitoring of the quality of the second channel continues. If the timeout period has occurred in the fifth decision step 350, the method 300 returns to the third decision step 325 wherein it is determined whether all of the channels available have been queried. If not, a third channel is selected in the step 330 and the method 300 determines a quality of this channel and proceeds, as described above.

This process of selecting channels and determining their quality continues until a channel of acceptable quality is selected for the wireless client. In the event that all of the available channels have been queried in the third decision step 325 and their quality is below a particular threshold, the method 300 picks the previously selected channel having the best relative quality in the step 355. The method 300 then ends in the step 345, as before.

While the method disclosed herein has been described and shown with reference to particular steps performed in a particular order, it will be understood that these steps may be combined, subdivided, or reordered to form an equivalent method without departing from the teachings of the present invention. Accordingly, unless specifically indicated herein, the order and/or the grouping of the steps are not limitations of the present invention.

In summary, embodiments of a dynamic channel selector, a method of selecting a channel and an access point employing the dynamic channel selector and method, associated with a wireless local area network, have been presented. The dynamic channel selector assures a wireless client associated with the access point that a minimum channel quality may be maintained. This may occur in the presence of an interference that causes the noise level of the channel to increase above an acceptable threshold by selecting a higher quality channel, when available.

Although the present invention has been described in detail, those skilled in the art should understand that they can make various changes, substitutions and alterations herein without departing from the spirit and scope of the invention in its broadest form.

What is claimed is:

1. A dynamic channel selector for use with a wireless local area network, comprising:
    a channel quality subsystem configured to monitor a signal quality of a signal traversing a first channel of said wireless local area network and a noise level of said first channel; and
    an interference mitigation subsystem, coupled to said channel quality subsystem, configured to select a second channel of said wireless local area network as a function of said signal quality of said signal traversing said first channel and said noise level of said first channel, and the dynamic channel selector is embodied within a controller of an access point of said wireless local area network.

2. The dynamic channel selector as recited in claim 1 wherein said interference mitigation subsystem is configured to select said second channel when said signal quality of said signal traversing said first channel drops below a threshold.

3. The dynamic channel selector as recited in claim 1 wherein said interference mitigation subsystem is configured to select said second channel when said noise level of said first channel rises above a threshold.

4. The dynamic channel selector as recited in claim 1 wherein said channel quality subsystem is further configured to monitor a signal quality of a signal traversing said second channel and a noise level of said second channel, said interference mitigation subsystem being configured to select a third channel of said wireless local area network as a function of said signal quality of said signal traversing said second channel and said noise level of said second channel.

5. The dynamic channel selector as recited in claim 4 wherein said channel quality subsystem is further configured to monitor a signal quality of a signal traversing said third channel and a noise level of said third channel, said interference mitigation subsystem being configured to select one of said first, second and third channels as a function of said signal quality of said signal traversing said third channel and said noise level of said third channel.

6. The dynamic channel selector as recited in claim 1 wherein said dynamic channel selector is configured to employ memory to temporarily store information traversing said first channel.

7. A method of selecting a channel in a wireless local area network, comprising:
    monitoring a signal quality of a signal traversing a first channel of said wireless local area network and a noise level of said first channel; and
    selecting a second channel of said wireless local area network as a function of said signal quality of said signal traversing said first channel and said noise level of said first channel, and said method is performed within a controller of an access point of said wireless local area network.

8. The method as recited in claim 7 wherein said selecting comprises selecting said second channel when said signal quality of said signal traversing said first channel drops below a threshold.

9. The method as recited in claim 7 wherein said selecting comprises selecting said second channel when said noise level of said first channel rises above a threshold.

10. The method as recited in claim 7, further comprising:
monitoring a signal quality of a signal traversing said second channel and a noise level of said second channel; and
selecting a third channel of said wireless local area network as a function of said signal quality of said signal traversing said second channel and said noise level of said second channel.

11. The method as recited in claim 10, further comprising:
monitoring a signal quality of a signal traversing said third channel and a noise level of said third channel; and
selecting one of said first, second and third channels as a function of said signal quality of said signal traversing said third channel and said noise level of said third channel.

12. The method as recited in claim 7 further comprising temporarily storing information traversing said first channel.

13. An access point, comprising:
a network interface coupled to a wired network;
a transceiver coupled via an antenna to a wireless local area network; and
a controller, coupled to said network interface and said transceiver, including:
a multiplexer layer subsystem that multiplexes information traversing said access point,
a bridging subsystem that bridges information employing disparate forms of communication protocols, and
a dynamic channel selector, coupled to said multiplexer layer subsystem and said bridging subsystem, including:
a channel quality subsystem that monitors a signal quality of a signal traversing a first channel of said wireless local area network and a noise level of said first channel, and
an interference mitigation subsystem, coupled to said channel quality subsystem, that selects a second channel of said wireless local area network as a function of said signal quality of said signal traversing said first channel and said noise level of said first channel.

14. The access point as recited in claim 13 wherein said interference mitigation subsystem selects said second channel when said signal quality of said signal traversing said first channel drops below a threshold.

15. The access point as recited in claim 13 wherein said interference mitigation subsystem selects said second channel when said noise level of said first channel rises above a threshold.

16. The access point as recited in claim 13 wherein said channel quality subsystem further monitors a signal quality of a signal traversing said second channel and a noise level of said second channel, said interference mitigation subsystem selecting a third channel of said wireless local area network as a function of said signal quality of said signal traversing said second channel and said noise level of said second channel.

17. The access point as recited in claim 16 wherein said channel quality subsystem further monitors a signal quality of a signal traversing said third channel and a noise level of said third channel, said interference mitigation subsystem selecting one of said first, second and third channels as a function of said signal quality of said signal traversing said third channel and said noise level of said third channel.

18. The access point as recited in claim 13 further comprising memory, said dynamic channel selector employing said memory to temporarily store information traversing said first channel.

* * * * *